United States Patent
Sawhney et al.

(10) Patent No.: US 9,480,003 B2
(45) Date of Patent: Oct. 25, 2016

(54) APPARATUS AND METHOD FOR DETERMINING CELL SUITABILITY FOR A WIRELESS DEVICE IN A COMMUNICATION SYSTEM

(75) Inventors: Salil Sawhney, San Diego, CA (US); Francesco Pica, San Diego, CA (US); Nathan Tenny, San Diego, CA (US); Francesco Grilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 550 days.

(21) Appl. No.: 12/696,001

(22) Filed: Jan. 28, 2010

(65) Prior Publication Data

US 2010/0197304 A1    Aug. 5, 2010

Related U.S. Application Data

(60) Provisional application No. 61/148,970, filed on Feb. 1, 2009.

(51) Int. Cl.
*H04W 4/00* (2009.01)
*H04W 48/10* (2009.01)
(Continued)

(52) U.S. Cl.
CPC ............ *H04W 48/10* (2013.01); *H04W 48/20* (2013.01); *H04W 72/02* (2013.01)

(58) Field of Classification Search
CPC ... H04W 48/18; H04W 48/20; H04W 88/06; H04W 48/12; H04W 36/0055; H04W 48/10; H04W 48/16; H04W 4/06; H04W 84/045; H04W 36/08; H04W 36/14; H04W 36/38; H04W 48/02; H04W 48/04; H04W 72/02; H04W 92/00; H04W 36/0088; H04J 11/0069; H04L 12/2803; H04L 12/2832; H04L 69/08
USPC ............ 370/310, 310.2, 328, 329, 330, 331, 370/332, 333, 334; 455/422.1, 432.1, 433, 455/434, 435.1, 435.2, 435.3, 436, 437, 455/550.1, 552.1, 553.1
See application file for complete search history.

(56) References Cited

U.S. PATENT DOCUMENTS 6,128,490 A * 10/2000 Shaheen et al. .............. 455/434
6,600,917 B1 * 7/2003 Maupin ...................... 455/414.1
(Continued)

FOREIGN PATENT DOCUMENTS

CN    1838830 A    9/2006
EP    1705947      9/2006
(Continued)

OTHER PUBLICATIONS

International Search Report—PCT/US2010/022679, International Search Authority—European Patent Office—May 6, 2010.
(Continued)

*Primary Examiner* — Mahendra Patel
(74) *Attorney, Agent, or Firm* — Ashish L. Patel

(57) ABSTRACT

An apparatus and method for access stratum management comprising reading system information from at least one broadcast channel from a current serving cell; and determining if an available cell is suitable for a user equipment (UE) based on information included in the broadcasted system information, wherein the determining step comprises at least one of the following: comparing system release information of the user equipment (UE) from the broadcasted system information; determining if the available cell supports a specific feature which makes the available cell suitable for optimum performance of the UE; or determining if the available cell and a frequency combination are suitable for a UE type.

8 Claims, 8 Drawing Sheets

(51) Int. Cl.
*H04W 48/20* (2009.01)
*H04W 72/02* (2009.01)

(56) References Cited

U.S. PATENT DOCUMENTS

| | | | | |
|---|---|---|---|---|
| 8,081,759 | B2* | 12/2011 | Faccin et al. | 380/273 |
| 2001/0041577 | A1* | 11/2001 | Weber | H04W 48/02 455/458 |
| 2002/0105927 | A1* | 8/2002 | Holma | H04W 36/0061 370/331 |
| 2005/0090278 | A1* | 4/2005 | Jeong | H04W 36/0055 455/525 |
| 2006/0023712 | A1* | 2/2006 | Shaheen | 370/389 |
| 2006/0089127 | A1 | 4/2006 | Muratsu | |
| 2006/0217124 | A1* | 9/2006 | Bi et al. | 455/450 |
| 2006/0268926 | A1* | 11/2006 | Zanaty | 370/463 |
| 2007/0022200 | A1* | 1/2007 | Benkert et al. | 709/227 |
| 2007/0184834 | A1* | 8/2007 | Jeong et al. | 455/434 |
| 2007/0270148 | A1* | 11/2007 | Yeh et al. | 455/436 |
| 2008/0004064 | A1 | 1/2008 | Sakurai et al. | |
| 2008/0057948 | A1* | 3/2008 | Mittal et al. | 455/426.1 |
| 2008/0188228 | A1* | 8/2008 | Pecen et al. | 455/449 |
| 2009/0034452 | A1* | 2/2009 | Somasundaram | H04J 11/0069 370/328 |
| 2009/0238114 | A1* | 9/2009 | Deshpande et al. | 370/328 |
| 2009/0265543 | A1* | 10/2009 | Khetawat et al. | 713/151 |
| 2009/0274086 | A1* | 11/2009 | Petrovic et al. | 370/312 |
| 2010/0022250 | A1* | 1/2010 | Petrovic | H04J 11/0093 455/450 |
| 2010/0061337 | A1* | 3/2010 | Hallenstal et al. | 370/331 |
| 2010/0165960 | A1* | 7/2010 | Richardson | H04W 88/08 370/338 |
| 2010/0167736 | A1 | 7/2010 | Kobayashi | |

FOREIGN PATENT DOCUMENTS

| | | |
|---|---|---|
| EP | 1802161 A1 | 6/2007 |
| JP | 2003525533 A | 8/2003 |
| JP | 2006121576 A | 5/2006 |
| JP | 2006197122 A | 7/2006 |
| JP | 2008011285 A | 1/2008 |
| WO | WO9851103 | 11/1998 |
| WO | WO-0038456 A1 | 6/2000 |
| WO | WO0126409 | 4/2001 |
| WO | WO-2006106561 A1 | 10/2006 |
| WO | WO-2007091823 A1 | 8/2007 |
| WO | WO-2007097145 A1 | 8/2007 |
| WO | WO2007144029 | 12/2007 |
| WO | WO 2007144029 A1 * | 12/2007 |

OTHER PUBLICATIONS

Mohnaty, S., et al., "Partial proposal for Efficient Transmission of Certain System Parameters and System Configuration Information in IEEE 802," IEEE C802.16m-08/418, IEEE 802.16 Task Group m (TGm), May 5, 2008.
NTT DoCoMo, Inc., NEC: "UE Capabilities in LTE", R2-073999, 3GPP TSG-RAN WG2 #59bis, Oct. 12, 2007.
Shim, J., et al., "Operation to support multiple MAC versions," IEEE C802.16maint-08/305r1,IEEE 802.16's Maintenance Task Group, Sep. 18, 2008.
Taiwan Search Report—TW099102858—TIPO—Mar. 12, 2013.
Written Opinion—PCT/US2010/022679—ISA/EPO—Jun. 5, 2010.
"3rd Generation Partnership Project; Technical Specification Group Radio Access Network; Evolved Universal Terrestrial Radio Access (E-UTRA); User Equipment (UE) procedures in idle mode (Release 8)" 3GPP Standard; 3GPP TS 36.304, 3rd Generation Partnership Project (3GPP), Mobile Competence Centre; 650, Route Des Lucioles; F-06921 Sophia-Antipolis Cedex; France, No. V8.4.0, Dec. 1, 2008 (Dec. 1, 2008), pp. 1-29, XP050377596 paragraph [05.2]-paragraph [05.3].

* cited by examiner

APPARATUS AND METHOD FOR DETERMINING CELL SUITABILITY FOR A WIRELESS DEVICE IN A COMMUNICATION SYSTEM

CLAIM OF PRIORITY UNDER 35 U.S.C. 119

The present Application for Patent claims priority to Provisional Application No. 61/148,970 entitled Method and Apparatus for Access Stratum Management of Wireless Devices filed Feb. 1, 2009, and assigned to the assignee hereof and hereby expressly incorporated by reference herein.

FIELD

This disclosure relates generally to apparatus and method for controlling access to a wireless network. More particularly, the disclosure relates to access stratum management of wireless devices.

BACKGROUND

Wireless communication systems deliver a wide variety of communication services to mobile users separated and/or moving from the fixed telecommunications infrastructure. These wireless systems employ radio techniques to interconnect mobile user devices with various base stations in a wireless communication network, often in a cellular geometry. The base stations, in turn, are connected to mobile switching centers which route connections to and from the mobile user devices to other users on different communications networks such as the public switched telephony network (PSTN), Internet, etc. In this manner, users that are away from fixed sites or are on the move may receive various communication services such as voice telephony, paging, messaging, email, data transfers, video, Web browsing, etc.

Since radio frequencies are employed for the base station-mobile user wireless interconnection, all wireless users must agree on a common set of protocols to share the scarce radio spectrum allocated for wireless communication services. One important protocol relates to the access method used to connect a mobile user device to the wireless communications network. Various access methods include frequency division multiple access (FDMA), time division multiple access (TDMA), code division multiple access (CDMA), and orthogonal frequency division multiplex (OFDM). OFDM utilizes a plurality of carriers spaced apart in the frequency domain such that data modulated on each carrier is orthogonal to the others.

One popular wireless communication protocol suite is known as Universal Mobile Telecommunications System (UMTS). UMTS is an evolving third generation wireless communication system with ongoing upgrades, documented in a series of protocol releases. For example, Release 1999 (R99) established the basic circuit switched and packet switched network services for UMTS. Subsequent releases, such as Rel-4, Rel-5, Rel-6, Rel-7, Rel-8, etc. have enhanced the capabilities of UMTS in many aspects, for example, increased data rates, improved Internet Protocol (IP) access, higher order modulation, multiple input multiple output (MIMO) transmission, etc.

SUMMARY

Disclosed is an apparatus and method for access stratum management of wireless devices. According to one aspect, a method for access stratum management comprising reading system information from at least one broadcast channel from a current serving cell; and determining if an available cell is suitable for a user equipment (UE) based on information included in the broadcasted system information, wherein the determining step comprises at least one of the following: comparing system release information of the user equipment (UE) from the broadcasted system information; determining if the available cell supports a specific feature which makes the available cell suitable for optimum performance of the UE; or determining if the available cell and a frequency combination are suitable for a UE type.

According to another aspect, a user equipment comprising a processor and a memory, the memory containing program code executable by the processor for performing the following: reading system information from at least one broadcast channel from a current serving cell; and determining if an available cell is suitable for the user equipment (UE) based on information included in the broadcasted system information, wherein the program code for the determining step comprises program code for performing at least one of the following: comparing system release information of the user equipment (UE) from the broadcasted system information; determining if the available cell supports a specific feature which makes the available cell suitable for optimum performance of the UE; or determining if the available cell and a frequency combination are suitable for a UE type.

According to another aspect, a user equipment for access stratum management comprising means for reading system information from at least one broadcast channel from a current serving cell; and means for determining if an available cell is suitable for the user equipment (UE) based on information included in the broadcasted system information, wherein the means for determining comprises at least one of the following: means for comparing system release information of the user equipment (UE) from the broadcasted system information; means for determining if the available cell supports a specific feature which makes the available cell suitable for optimum performance of the UE; or means for determining if the available cell and a frequency combination are suitable for a UE type.

According to another aspect, a computer-readable medium storing a computer program, wherein execution of the computer program is for: reading system information from at least one broadcast channel from a current serving cell; and determining if an available cell is suitable for a user equipment (UE) based on information included in the broadcasted system information, wherein the determining step comprises at least one of the following: comparing system release information of the user equipment (UE) from the broadcasted system information; determining if the available cell supports a specific feature which makes the available cell suitable for optimum performance of the UE; or determining if the available cell and a frequency combination are suitable for a UE type.

Advantages of the present disclosure include the ability to determine whether a certain carrier is suitable for use by a user equipment (UE) based on specific criteria, ensuring that only UEs meeting certain specified criteria are allowed to camp on certain carriers (i.e., frequencies), etc.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
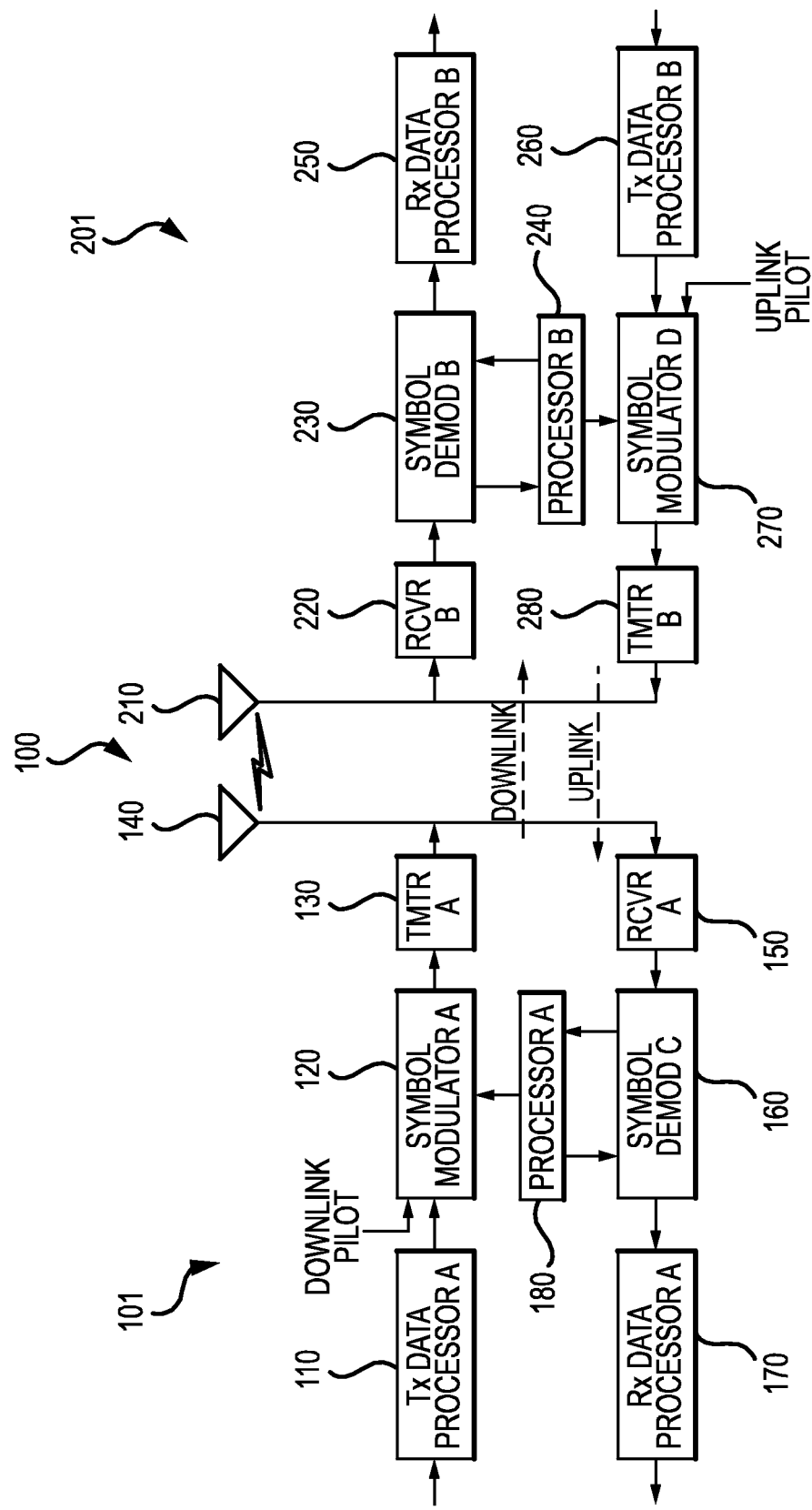
FIG. 1 is a block diagram illustrating an example of a two terminal system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

In many telecommunication systems, communications networks are used to exchange messages among several interacting spatially-separated devices. The various types of networks may be classified in different aspects. In one example, the geographic scope of the network could be over a wide area, a metropolitan area, a local area, or a personal area, and the corresponding networks would be designated as wide area network (WAN), metropolitan area network (MAN), local area network (LAN), or personal area network (PAN). Networks also differ in the switching/routing technique used to interconnect the various network nodes and devices (e.g. circuit switching vs. packet switching), in the type of physical media employed for transmission (e.g. wired vs. wireless), or in the set of communication protocols used (e.g. Internet protocol suite, SONET (Synchronous Optical Networking), Ethernet, etc.).

One important characteristic of communications networks is the choice of wired or wireless media for the transmission of electrical signals among the constituents of the network. In the case of wired networks, tangible physical media such as copper wire, coaxial cable, fiber optic cable, etc. are employed to propagate guided electromagnetic waveforms which carry message traffic over a distance. Wired networks are a static form of communications networks and are typically favored for interconnection of fixed network elements or for bulk data transfer. For example, fiber optic cables are often the preferred transmission media for very high throughput transport applications over long distances between large network hubs, such as, bulk data transport across or between continents over the Earth's surface.

On the other hand, wireless networks are often preferred when the network elements are mobile with dynamic connectivity needs or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. However, usage of wireless propagation requires significant active resource management among the network users and high levels of mutual coordination and cooperation for compatible spectrum utilization.

In one example, wireless networks are compatible with various wireless protocols. Exemplary versions of wireless protocols include Universal Mobile Telecommunications System (UMTS), High Speed Downlink Packet Access (HSDPA), High Speed Uplink Packet Access (HSUPA), Long Term Evolution (LTE), etc. Wireless systems compliant with these protocols are used for various communication services such as telephony, messaging, data transfer, emails, Internet access, audio broadcasts, video communications, etc. These wireless systems generally utilize an access node (AN), also known as base station (BS) or Node B, to connect to an individual access terminal (AT), also known as user equipment (UE) or user device, to fixed telecommunications infrastructure networks. In general, a radio coverage area is implemented using a plurality of Node Bs using a cellular-based topological architecture to provide wireless access, also known as an air interface, to the UEs (e.g., user devices). Examples of fixed telecommunications infrastructure networks include the public switched telephony network (PSTN), Internet, private data networks, etc. In one aspect, the Node Bs may be connected to a Radio Network Controller (RNC) to facilitate the interconnection to the fixed telecommunications infrastructure networks.

FIG. 1 is a block diagram illustrating an example of a two terminal system 100. One skilled in the art would understand that the example two terminal system 100 illustrated in FIG. 1 may be implemented in an FDMA environment, an OFDMA environment, a CDMA environment, a WCDMA environment, a TDMA environment, a SDMA environment or any other suitable wireless environment.

In one aspect, the two terminal system 100 includes an access node 101 (e.g., base station or Node B) and a user equipment or UE 201 (e.g., user device). In the downlink leg, the access node 101 (e.g., base station or Node B) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 (e.g., user device) includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 (e.g., user device) includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 (e.g., user device) is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station or Node B) and at the UE 201 (e.g., user device), respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

Figure 2:
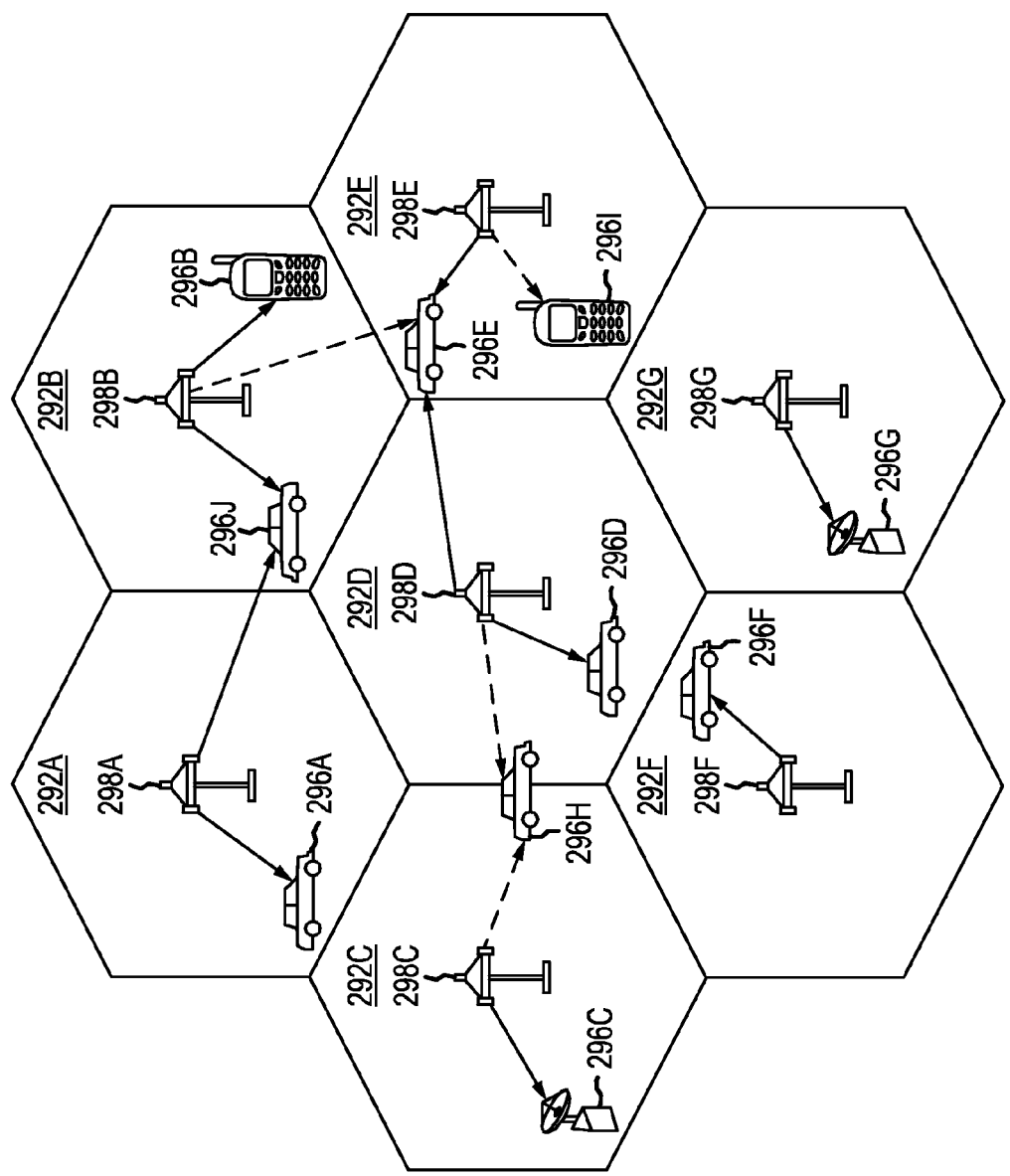
FIG. 2 illustrates an example of a wireless communications system that supports a plurality of user devices.

In one aspect, the two terminal system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs (e.g., user devices). In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal FIG. 2 illustrates an example of a wireless communications system 290 that supports a plurality of user devices. In FIG. 2, reference numerals 292A to 292G refer to cells, reference numerals 298A to 298G refer to base stations (BS) or node Bs and reference numerals 296A to 296J refer to access user devices (a.k.a. user equipments (UE)). Cell size may vary. Any of a variety of algorithms and methods may be used to schedule transmissions in system 290. System 290 provides communication for a number of cells 292A through 292G, each of which is serviced by a corresponding base station 298A through 298G, respectively.

Communication processes between two interacting nodes may be conveniently described by a protocol stack. A protocol stack is a layered decomposition model of the communication process between two peer entities. In this model, processes related to the physical aspects of communication (e.g., the physical layer) appear as lower layers in the protocol stack and processes related to the user aspects (e.g., the application layer) appear as upper layers in the protocol stack. The lower layers provide services to the upper layers.

Figure 3:
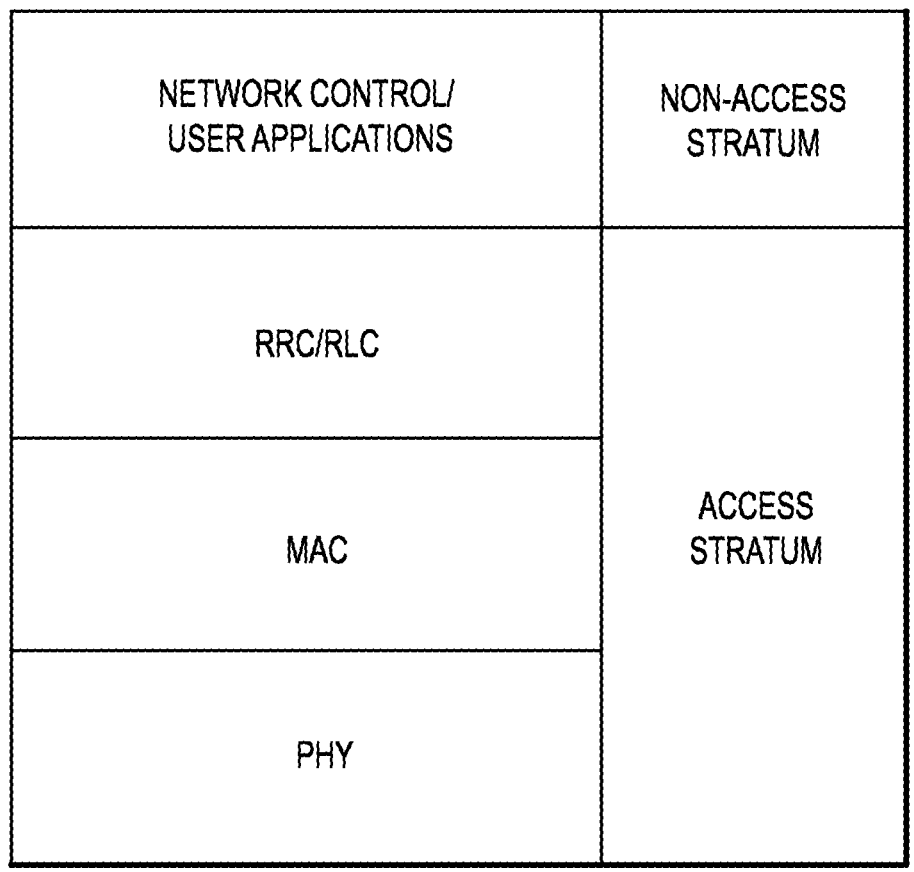
FIG. 3 illustrates an example of a UMTS protocol stack.

FIG. 3 illustrates an example of a UMTS protocol stack. In one example, the protocol stack for a wireless communication system may be decomposed into two layers known as the access stratum and the non-access stratum as illustrated in FIG. 3. The access stratum provides communication access to end users and supports the transport services provided by the non-access stratum to the core network. In one aspect, the access stratum represents the lower part of the UMTS protocol stack for wireless interface functions and includes the Physical (PHY) layer, Medium Access Control (MAC) layer, Radio Link Control (RLC) layer, and Packet Data Convergence Protocol (PDCP) layer.

In one aspect, a stratum is defined as the grouping of protocols related to certain communication services provided by a node. In one example, the access stratum consists of entities which affect user access to the wireless network such as: physical layer aspects (modulation, coding, spreading, etc.), medium access layer (MAC) aspects, radio link control (RLC) aspects, etc. In contrast, the non-access stratum consists of entities which affect user to user communications, independent of the access method (e.g., file transfer protocol (FTP), voice over IP (VoIP), etc.).

In one aspect, a wireless user equipment (UE) camps (i.e., searches by default) on a particular carrier or carriers to access or signal the wireless network. The wireless network may be based on, for example, Universal Mobile Telecommunications System (UMTS) or Long Term Evolution (LTE). However, one skilled in the art would understand that other wireless communication systems besides UMTS and LTE can be used without affecting the spirit or scope of the present disclosure.

Network operators seek improved methods for managing access to the plurality of carrier frequencies in a wireless network. In one aspect, the present disclosure discloses a simple technique to allow only UEs of a specific Access Stratum Release type or supporting a certain capability/feature or a specific type (handset vs. data-card) to camp on one of many frequencies deployed in multi-carrier cellular networks such as, but not limited to, UMTS or LTE. This increases the degree of flexibility for the network operator in ensuring that only certain types/classes of UEs can camp on a certain carrier (frequency). For example, if a network operator desires to use a certain frequency for specific data-card customers that have HSDPA (High Speed Downlink Packet Access) enabled devices, they may allow only such devices to camp on that carrier.

In one aspect, the present disclosed methods are used to prevent UEs from camping on macro vs. femto cells which may use two different frequencies. For example, operators may allow only UMTS Rel-5 UEs to camp on a femto cell. In one aspect, a femto cell is a cell with small coverage area, particularly for indoor use. Overall, the present disclosure provides techniques to enable UEs to determine that a certain carrier is unsuitable for use based on specific criteria.

In another aspect UMTS/LTE Rel-8 specifications have included a frequency priority scheme which allows broadcasting of a relative frequency priority list to all UEs and also an absolute frequency priority scheme sent to individual UEs.

In one aspect, the absolute frequency priority scheme allows a UE to receive a specific/customized list of prioritized frequencies based on the UEs Access Stratum Release information, feature capabilities and other criteria using, for example, a UTRAN (UMTS Terrestrial Radio Access Network) Mobility Information message. In one example, a Mobility Information message is a message sent by the UTRAN to convey mobility information to the UEs.

The absolute frequency priority list is used to inform the UE of a prioritized list of frequencies it must attempt to access with the highest priority frequency being the most suitable given the UEs release and features. In one example this occurs when a UE attempts to power up and register with the network or when it re-selects to a new cell. Following receipt of this absolute frequency priority information, the UE then attempts to camp and make calls on the highest priority frequency that is most suitable based on its release and feature-set.

In one aspect, the present disclosure allows user devices to directly read a broadcast channel on the wireless network and determine if the specific carrier is suitable given the device characteristics. For example in the UMTS/LTE wireless network, the System Information broadcast messages may include additional fields such as:

1. A field that allows access to UEs of a specific UMTS Release type (Rel 99, Rel-5, Rel-6, Rel-7, Rel-8, etc.)
2. A field that distinguishes UEs by device type—handset vs. data-card 3. A field (bit map) that distinguishes support for features such as HSDPA, EUL (Enhanced Uplink which is also called HSUPA), MIMO (multiple input multiple output), Continous Packet Connectivity and various other features. In one example, the bit map may indicate which of the features are explicitly not supported by this cell (i.e., frequency) and that the UEs which support this feature should not camp on this cell (i.e., frequency).

In one example, the UE may also be populated with information that specifies whether it is a handset or a data-card. One skilled in the art would understand that other fields may be included without affecting the spirit or scope of the present disclosure.

The present disclosure provides flexibility for multicarrier deployments and at the same time can be used selectively for single carrier deployments where the operator may provide services to only specific types of UEs. It provides options to network operators planning to offer specific applications, services or quality of service (QoS) to certain user types on a particular frequency.

In one aspect, the disclosed methods allow UEs to camp on only selected frequency cells based on criteria that may be set by the network operator. The disclosed methods may be quickly executed since it only requires the UE to read the broadcast channel of the cell. While the UMTS/LTE Rel-8 specification provides an absolute frequency priority scheme, the current disclosed scheme is an alternative scheme that is simpler to implement in certain cases, since it includes differentiation between handset/data cards explicitly and can be extended to include other options. It also does not require providing an absolute priority list to the UE via dedicated messaging.

Figure 4A:
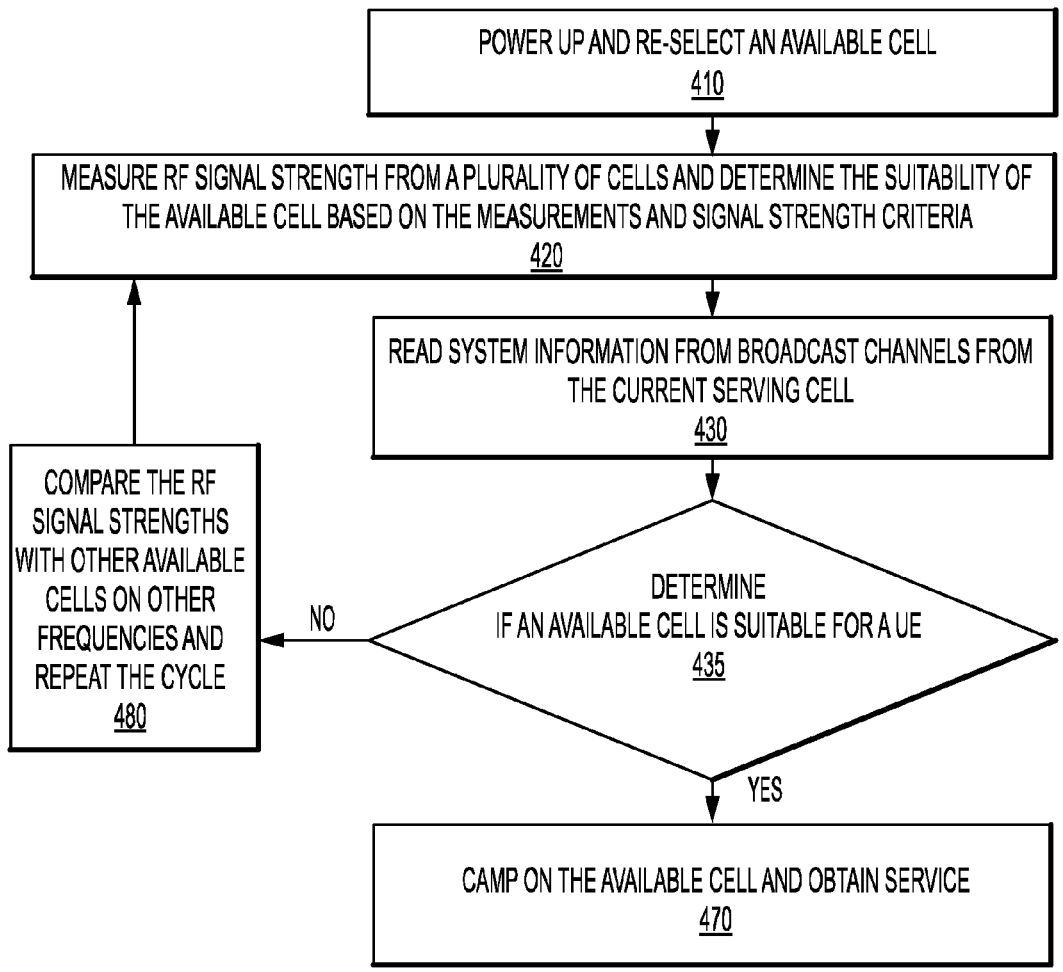
FIGS. 4A and 4B illustrate two example flow diagrams for access stratum release of wireless devices.

FIG. 4A illustrates an example flow diagram for access stratum release of wireless devices. In block 410, power up and re-select an available cell. Following block 410, in block 420, measure RF signal strength from a plurality of cells and determine the suitability of the available cell based on the measurements and signal strength criteria. Following block 420, in block 430, read System Information from broadcast channels from the current serving cell. Next in block 435, determine if a user equipment (UE) is suitable for the available cell. If yes, proceed to block 470. If no, proceed to block 480. In one aspect, the block 435 comprises at least one of the following blocks 440, 450 or 460 as illustrated in FIG. 4B.

In block 440, compare system release information from the broadcasted System Information to the system release information of the UE. If they are the same, proceed to block 450. If they are not the same, proceed to block 480.

In block 450, determine if the available cell supports a specific feature which makes it suitable for optimum performance of the UE. If yes, proceed to block 460. If no, proceed to block 480. In block 460, determine if the available cell and frequency combination are suitable for the UE (i.e., the types of UE such as handset, data card, etc.). If yes, proceed to block 470. If no, proceed to block 480. In block 470, camp on the available cell and obtain service. In block 480, compare the RF signal strengths with other available cells on other frequencies and repeat the cycle starting at block 420. In one example, the user equipment performs the steps in the flow diagrams of FIGS. 4A and 4B.

Figure 4B:
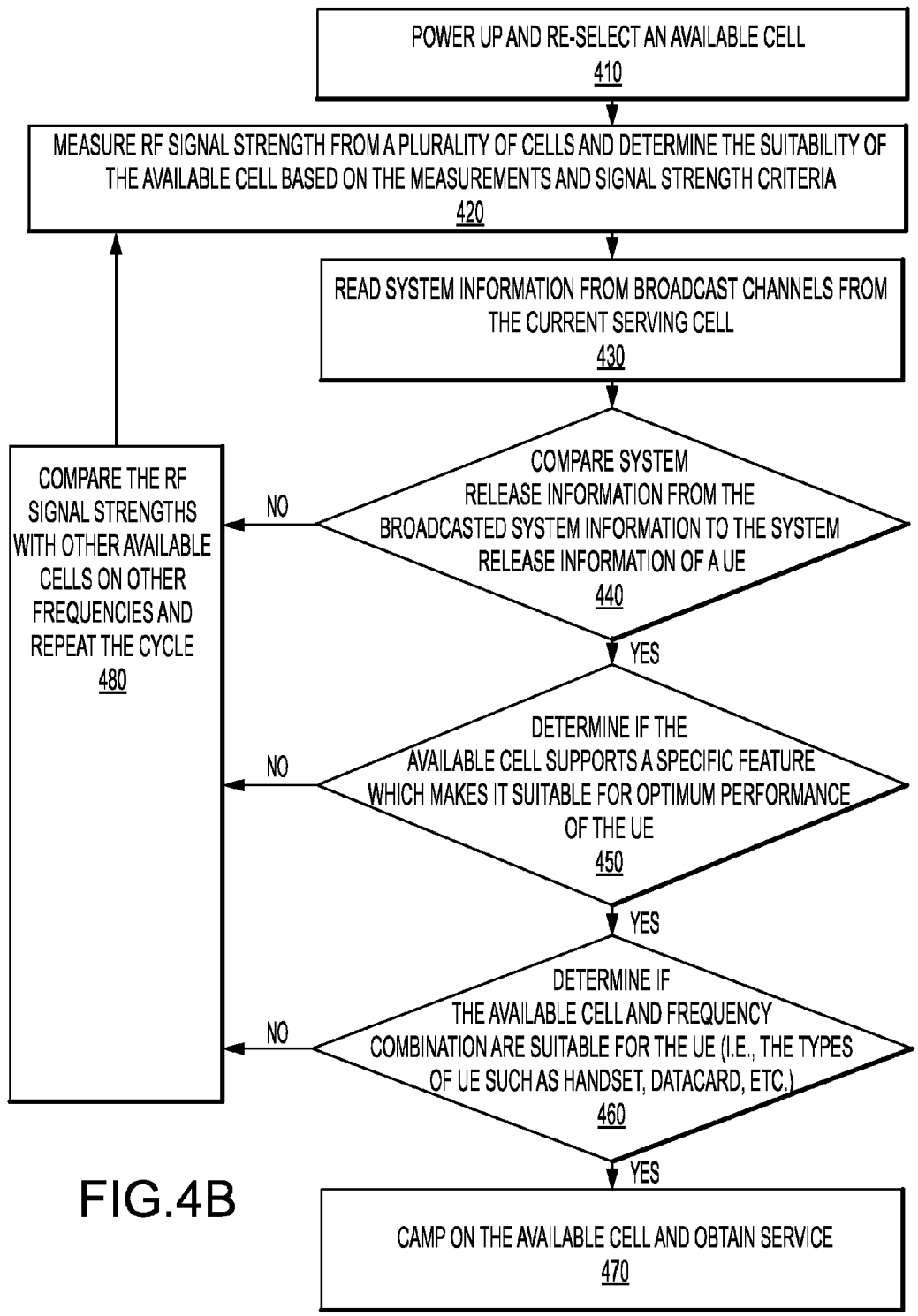

One skilled in the art would understand that the steps disclosed in the example flow diagram in FIGS. 4A and 4B can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 5:
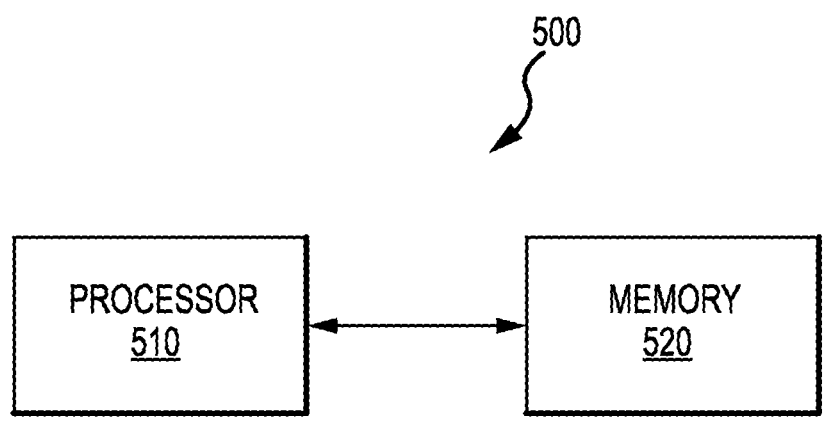
FIG. 5 illustrates an example of a device comprising a processor in communication with a memory for executing the processes for access stratum release of wireless devices.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 5 illustrates an example of a device 500 comprising a processor 510 in communication with a memory 520 for executing the processes for access stratum release of wireless devices. In one example, the device 500 is used to implement the algorithms illustrated in FIGS. 4A and 4B. In one aspect, the memory 520 is located within the processor 510. In another aspect, the memory 520 is external to the processor 510. In one aspect, the processor includes circuitry for implementing or performing the various flow diagrams, logical blocks and/or modules described herein.

Figure 6A:
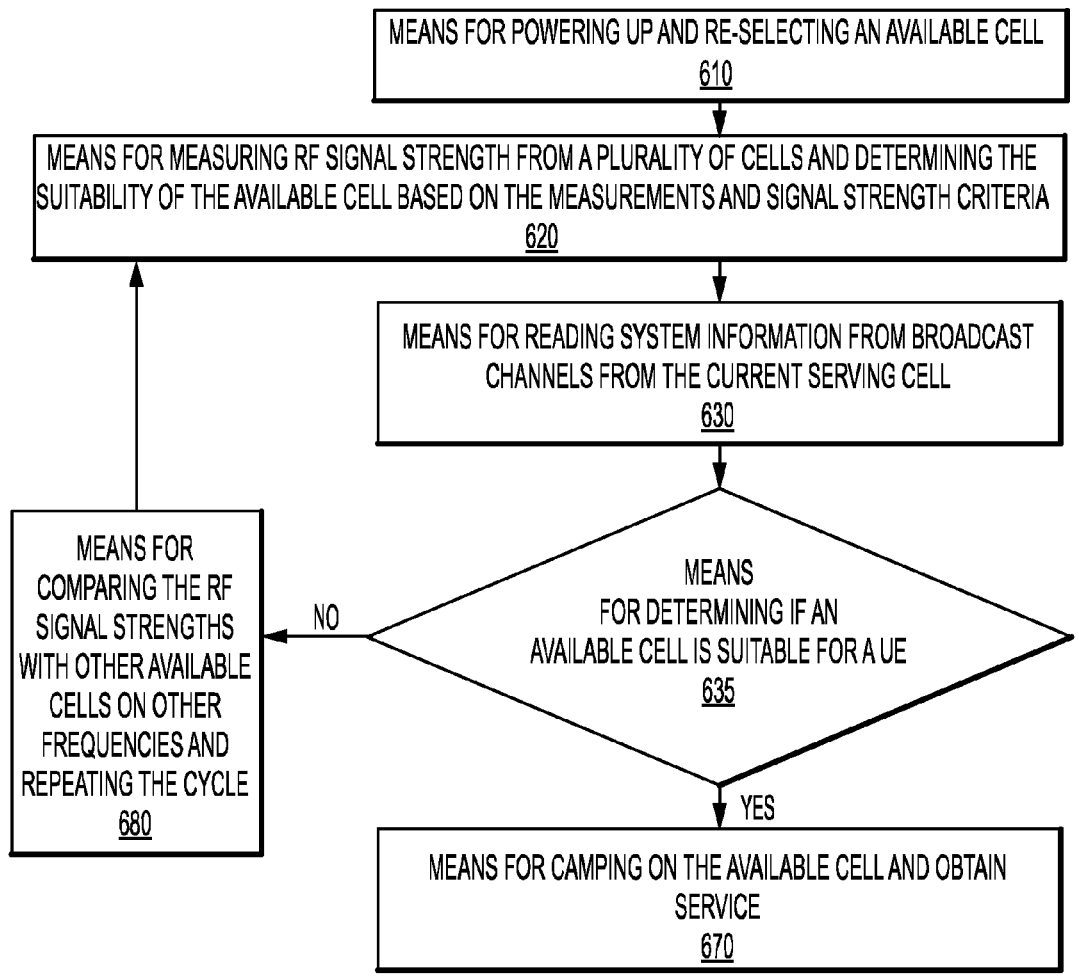
FIGS. 6A and 6B illustrate two examples of devices suitable for access stratum release of wireless devices.
Figure 6B:
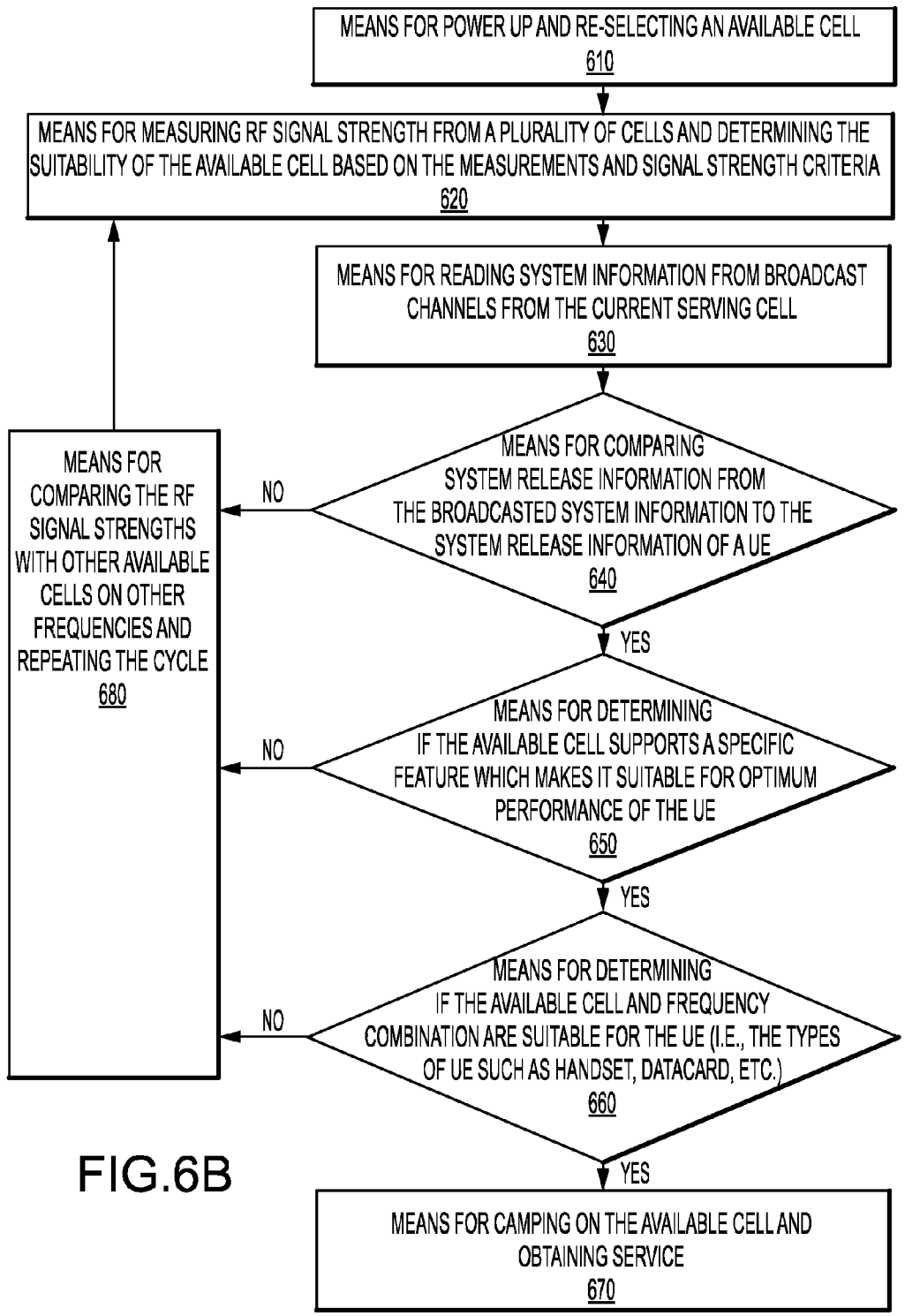

FIG. 6A illustrates an example of a device 600 suitable for access stratum release of wireless devices. In one aspect, the device 600 is implemented by at least one processor comprising one or more modules configured to provide different aspects of access stratum release of wireless devices as described herein in blocks 610, 620, 630, 635, 670 and 680. In one aspect, the block 635 comprises at least one of the following blocks 640, 650 or 660 as illustrated in FIG. 6B.

For example, each module comprises hardware, firmware, software, or any combination thereof. In one aspect, the device 600 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for determining cell suitability for a user equipment (UE) in a cellular wireless communication system comprising:
    receiving at a UE broadcast system information, the system information identifying:
        a UE structural feature supported by an available cell, or a UE functional feature supported by the available cell; and
        UEs that a system operator excludes from camping on the available cell; and
    determining at the UE whether the available cell is suitable for the UE to camp on based on the received broadcast system information;
    wherein said UE structural feature is a handset UE or a data-card UE, and said UE functional feature is UE access stratum type or UE wireless protocol type.

2. A UE comprising a processor coupled to a memory, the memory containing program code executable by the processor for performing the following:
    receiving broadcast system information, the system information identifying:
        a UE structural feature supported by an available cell, or a UE functional feature supported by the available cell; and
        UEs that a system operator excludes from camping on the available cell; and
    determining whether the available cell is suitable for the UE to camp on based on the received broadcast system information;
    wherein said UE structural feature is a handset UE or a data-card UE, and said UE functional feature is UE access stratum type or UE wireless protocol type.

3. A UE that determines cell suitability in a cellular wireless communication system comprising
    means for receiving at a UE broadcast system information, the system information identifying:
        a UE structural feature supported by an available cell, or a UE functional feature supported by the available cell; and
        UEs that a system operator excludes from camping on the available cell; and
    determining whether the available cell is suitable for the UE to camp on based on the received broadcast system information;
    wherein said UE structural feature is a handset UE or a data-card UE, and said UE functional feature is UE access stratum type or UE wireless protocol type.

4. A non-transitory computer-readable medium for use with a UE and for storing a computer program, wherein execution of the computer program is for:
    receiving broadcast system information, the system information identifying:
        a UE structural feature supported by an available cell, or a UE functional feature supported by the available cell; and
        UEs that a system operator excludes from camping on the available cell; and
    determining whether the available cell is suitable for the UE to camp on based on the received broadcast system information;
    wherein said UE structural feature is a handset UE or a data-card UE, and said UE functional feature is UE access stratum type or UE wireless protocol type.

5. A method for cell access management, comprising:
    providing broadcast system information, the system information identifying:
        a UE structural feature supported by an available cell, or a UE functional feature supported by the available cell; and
        UEs that a system operator exclude from camping on the available cell; and
    providing an indication of whether the available cell is suitable for the UE to camp on based on the received broadcast system information;
    wherein said UE structural feature is a handset UE or a data-card UE, and said UE functional feature is UE access stratum type or UE wireless protocol type.

6. An apparatus for cell access management comprising a processor coupled to a memory, the memory containing program code executable by the processor to cause operations comprising:
    providing broadcast system information, the system information identifying:
        a UE structural feature supported by an available cell, or a UE functional feature supported by the available cell; and
        UEs that a system operator exclude from camping on the available cell; and
    providing an indication of whether the available cell is suitable for the UE to camp on based on the received broadcast system information;

wherein said UE structural feature is a handset UE or a data-card UE, and said UE functional feature is UE access stratum type or UE wireless protocol type.

7. An apparatus for cell access management, comprising:
means for providing broadcast system information, the system information identifying:
  a UE structural feature supported by an available cell, or a UE functional feature supported by the available cell; and
  UEs that a system operator exclude from camping on the available cell; and
means for providing an indication of whether the available cell is suitable for the UE to camp on based on the received broadcast system information;
wherein said UE structural feature is a handset UE or a data-card UE, and said UE functional feature is UE access stratum type or UE wireless protocol type.

8. A non-transitory computer-readable medium for use with a cell access management apparatus and for storing a computer program, wherein execution of the computer program is for:
providing broadcast system information, the system information identifying:
  a UE structural feature supported by an available cell, or a UE functional feature supported by the available cell; and
  UEs that a system operator exclude from camping on the available cell; and
providing an indication of whether the available cell is suitable for the UE to camp on based on the received broadcast system information;
wherein said UE structural feature is a handset UE or a data-card UE, and said UE functional feature is UE access stratum type or UE wireless protocol type.

* * * * *